INVENTOR.
William W. Showler
BY
B. B. Olive
ATTORNEY

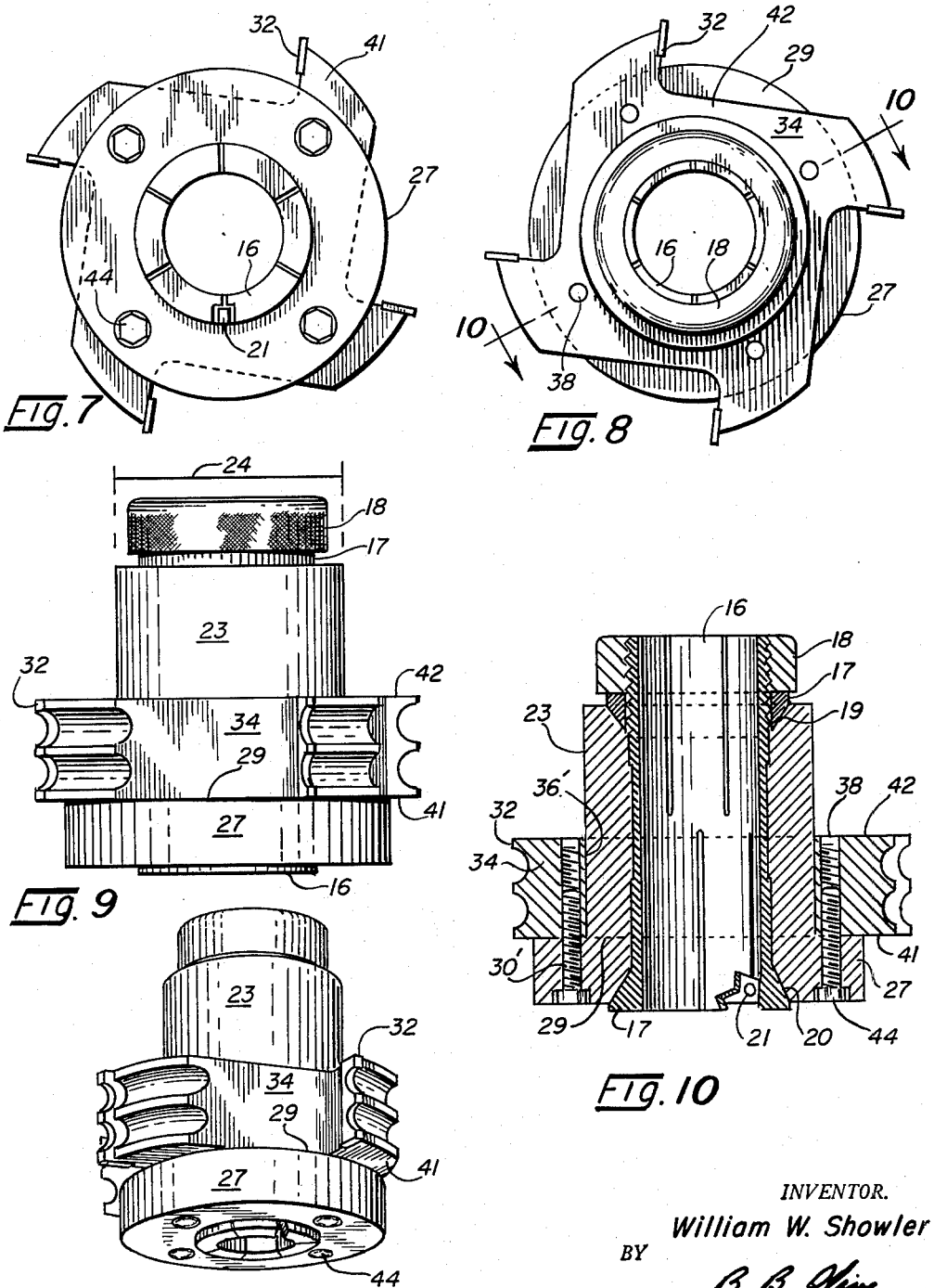

3,001,558
INTERCHANGEABLE WOOD CUTTER HEAD
William W. Showler, 2007 Thayer Circle,
Greensboro, N.C.
Filed Oct. 25, 1960, Ser. No. 64,886
2 Claims. (Cl. 144—218)

This invention relates to wood cutting tools and particularly to hub mounted molder and shaper heads used in the furniture industry.

Furniture moulding and shaping machines generally employ rotating arbors which may be conical, round or other shape. Mounted on each arbor is a hub whose bore is designed to match the particular shape arbor with which it is associated. Cutter bits are detachably secured to a supporting structure which in turn is secured to the hub periphery and the combination of the hub, the bit supporting structure and the bits is spoken of as a cutter head. Due to the difficulty of keeping the separately mounted and detachable bits in alignment and properly secured, there has developed in recent years a type of solid cutter head in which the bits, the bit support and the hub are formed as an integral unit and the bits are not subject to being detached as in the conventional type cutter head. While the integral cutter head is not apt to become misaligned and is safer, there is a disadvantage in that whenever there is a need to change the type of bit or in the event of damage to the hub or the bits, the entire cutter head must be replaced or at least be put out of service pending repair. Another disadvantage is that in the case of both the conventional and integral type cutter heads, considerable set-up and maintenance time is required An object of the present invention, therefore, is to provide an improved cutter head and system in which the bits and bit mounting structure of the cutter head are made as an integral bit unit and the hub portion of the cutter head is made as a separate integral hub unit such that the bits are not apt to become misaligned or insecure but are subject to being replaced separate and apart from the hub portion of the cutter head.

Another object is to provide cutter heads comprised of two integral units, a bit unit and a hub unit, and to provide a standard mounting arrangement for mounting the bores of the bit units on the outer surfaces of the hub units so that any style bit unit can be mounted on any hub unit irrespective of the type arbor to which the hub is adapted.

Another object is to reduce the set-up time required for changing cutter heads and particularly cutter head bits.

Another object is to reduce cutter head inventory requirements of bits and hubs.

Another object is to provide an improved cutter head having an improved rapid means of mounting and achieving concentric and vertical alignment of the bits with the arbor.

FIGURE 6 is a perspective view of an improved cutter head similar to the cutter head of FIGURE 1 but having a hub unit adapted to being mounted on a cylindrical type arbor and a different style bit unit.

FIGURE 7 is an end view of the cutter head of FIGURE 6.

FIGURE 8 is an end view looking at the end opposite from that taken with respect to FIGURE 7.

FIGURE 9 is a plan view of the cutter head of FIGURE 6.

FIGURE 10 is a cross section taken along line 10—10 of FIGURE 8.

In general, the improved cutter head of the invention employs a hub having a cylindrical body with a central bore adapted to a particular shape arbor. While individual hub bores may be different, the hubs are alike in that each is provided with an accurately ground outside cylindrical bearing surface which is concentric with the hub axis and which is of a standard common diameter. At one end of this cylindrical surface and integral with the body of the hub, each hub is formed with a relatively thick inflexible flange. The inside surface of this flange is made as an accurately ground bearing surface and is perpendicular to the axis of the hub. This described cylindrical hub body and flange comprises the integral hub unit. The bit unit for each cutter head is a separate integral unit and is made in a form in which the cutting bits are integrally mounted on the periphery of a suitable circular-cylinder-like body having chip clearance and the like. Each such bit unit body is provided with an accurately ground internal cylindrical bore of a standard common diameter and that is concentric with the axis of the bit unit body. The bore of the bit unit matches for mounting purposes in snug fit relation the outside cylindrical bearing surface of the hub unit which means that any bit unit can be mounted on any hub unit. The sides of the body of the bit units are ground as bearing surfaces perpendicular to the axis of the bit unit bore. The referred-to flange and the bit unit body are further provided with matching threaded bolts and threaded bolt holes such that the bit unit and consequently the bits once mounted on the hub unit can be brought into fixed concentric and vertical position with reference to the hub unit axis. Because of the concentric relation of the hub unit bearing surface, the bit unit bore and the cutting edge of the bits to the hub axis and the perpendicular relation of the flange bearing surface and the bit unit body side surface to the hub axis, correct concentric and vertical fixed alignment of the bits is quickly obtained upon mounting the bit unit on the hub unit and tightening of these bolts.

Figure 3:
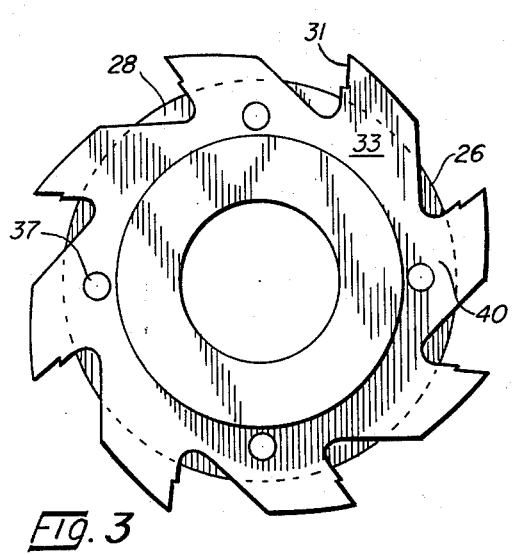
FIGURE 3 is an end view looking at the end opposite from that shown in FIGURE 2.
Figure 2:
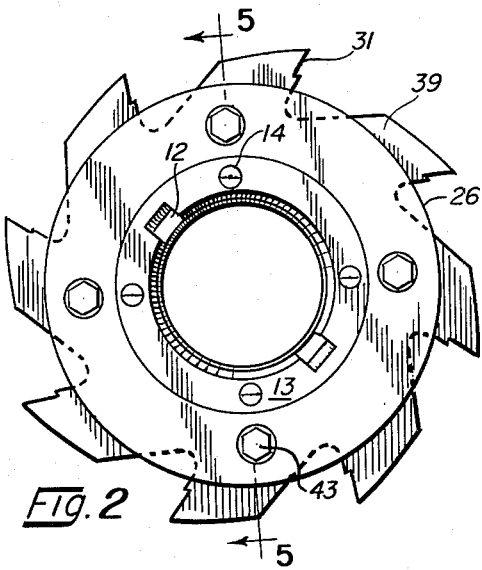
FIGURE 2 is an end view of the cutter head of FIGURE 1.
Figure 4:
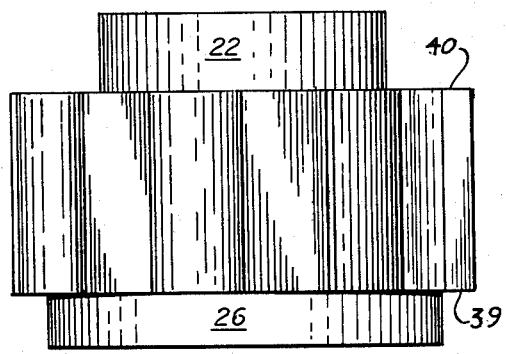
FIGURE 4 is a plan view of the cutter head of FIGURE 1.
Figure 5:
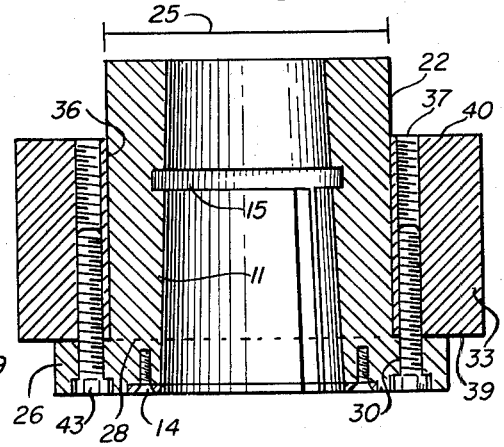
FIGURE 5 is a cross section taken along line 5—5 of FIGURE 2.
Figure 1:
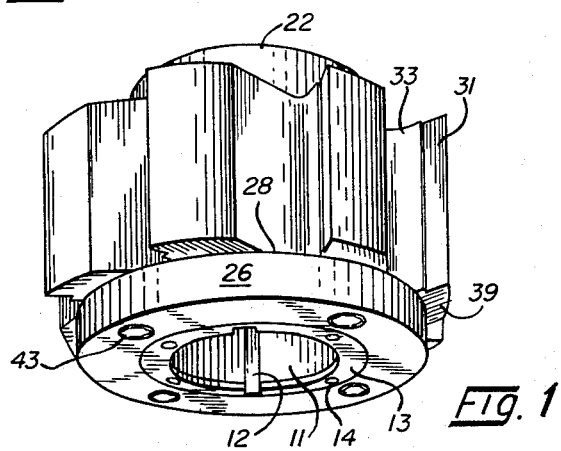
FIGURE 1 is a perspective view of an improved cutter head made according to the invention and having a hub unit adapted to being mounted on a conical type arbor.

Referring to the drawings, FIGURES 1 through 5 illustrate in a first example application of the invention to one style of bit and to a conical type arbor, the arbor itself not being shown. FIGURES 6 through 10 on the other hand show in a second example the invention applied to a different style bit and to a cylindrical type arbor.

In the first example, FIGURES 1 through 5, the hub unit includes for purposes of mounting on a conical type arbor, a conventional conical bore 11, spline groove 12, a spline protecting ring 13 of soft metal held by screws 14 and a lubricating recess 15. In the second example, FIGURES 6 through 10, the hub unit is designed for a cylindrical arbor and in this case includes for purposes of mounting a conventional compression cylinder 16 having a taper at one end, a tapered ring 17 fitted loosely around cylinder 16 at the opposite end of cylinder 16, a threaded tightening ring 18 and in the hub body, matching tapered hub surfaces 19, 20. A pin 21 fixed to the hub engages a slot in cylinder 16 to prevent rotation of the cylinder with respect to the hub. Those familiar with the art will recognize the described bore arrangements as being typical for mounting cutter head hubs on, respectively, conical and cylindrical type shafts. Heretofore, almost all changes in job set-ups have required the operator to go through one or more procedures of mounting hubs on arbors because of the general nature of conventional cutter heads.

Referring further to the first and second examples and particularly to the hub units, each hub includes a precision ground outside cylindrical surface designated as 22 and 23, respectively. The diameters indicated at reference lines 24, 25 of these cylindrical surfaces are identical and each hub unit is made at one end with an integral flange indicated at 26, 27 respectively. The flanges 26, 27 are in turn each provided with precision ground surfaces 28, 29 on the inside of the flanges. The referred-to surfaces 22 and 23 are each ground so as to present surfaces concentric with the hub axis while surfaces 28, 29 are each ground so as to present surfaces perpendicular to the hub axis. Each flange is further provided with bolt mounting holes 30, 30' respectively.

Referring next to the bit units, as distinct from the hub units, it can be seen that while two styles of bit units are illustrated, the bit units are alike in that each bit unit is an integral structure having integral cutting bits 31, 32, respectively, and saw tooth shape cylindrical like bit supporting bodies 33, 34 respectively. The bit units are further arranged with precision ground cylindrical bores 36, 36', respectively, which match in snug fit the previously referred to cylindrical surfaces 22, 23 and which similarly reside in concentric relation to the hub axis. In order to maintain the bit units in fixed position with respect to the hub units, the bit units are fitted with threaded holes 37, 38, respectively, which extend longitudinally through the body of the bit units and which match the previously referred to bolt holes 30, 30'. The sides of the bit units indicated respectively at 39, 40 for the first example and 41, 42 for the second example are each precision ground so to furnish surfaces perpendicular to the hub axis and matching with the flange surfaces 28, 29, previously referred to.

In operation, the hub unit needed for a particular shape arbor is drawn from stock and installed on the arbor. Depending on the style cut desired, the required bit unit is next selected and placed on the hub unit. It should be noted that irrespective of the direction of rotation of the arbor such as for right and left hand cutter heads, the bit units illustrated can be installed on the hub units in either of the two positions that might be required to obtain a cutting action. After placing the bit unit on the hub unit, the particular bit unit ground side surface and the hub unit ground flange surface are placed in contact and the bit unit is positioned on the hub unit so that the threaded holes of the bit unit are matched with the bolt holes of the hub unit as shown in the drawings. The bit unit is finally fixed in position by means of tightening suitable bolts as illustrated at 43, 44. Upon such positioning, the operator is immediately assured of having the bit unit in both concentric and vertical alignment due to the relation of the ground surfaces previously referred to.

Whenever it becomes desirable to repair or replace the style of bit unit, the hub unit may be left in place and the bit unit only need be replaced by another bit unit which may have a different style cut but which like the bit unit being replaced will have the same mounting arrangement with respect to the hub unit. Either of the two bit units illustrated in the drawings may, for example, be mounted on either of the two hub units illustrated. Furthermore, it will be seen that due to the concentric and vertical relation of the ground surfaces and the availability of the flange and bolt arrangement previously referred to, the assembly of the bit and hub units may be quickly achieved.

Having described my invention, I claim:

1. A cutter head for wood cutting machines having various shaped arbors comprising in combination a hub unit and a bit unit, said hub unit having a main cylindrical body including a central mounting bore conforming with an arbor of given shape and a precision ground cylindrical outer surface of standard diameter and concentric with the axis of said bore, said body being formed at one end as a flange having its inside surface precision ground perpendicular to said axis, said bit unit having a main cylinder-like body portion provided with a central precision ground bore of standard diameter adapted to snugly fit in concentric relation said hub unit cylindrical surface, said bit unit further having bits of predetermined shape mounted integrally with said bit unit body portion on the periphery thereof, the ends of said bit unit body being precision ground so as to form surfaces perpendicular to the axis of said bit unit body, and fastening means whereby either of said bit unit end surfaces may be firmly tightened against said inside flange surface.

2. A cutter head for wood cutting machines having various shaped arbors comprising in combination a hub unit and a bit unit, said hub unit having a main cylindrical body with a vertical flange at one end and a central bore concentric therewith adapted to a particular shape arbor, fastening means for fixedly positioning said hub unit on said arbor, said bit unit having a cylinder-like body with a central bore concentric therewith adapted to snugly fit over the cylindrical body of said hub unit, said bit unit further including bits of given shape made integral with said cylinder-like body, additional fastening means wherein either end of said bit unit may be fixedly positioned against said flange to bring said bits in fixed vertical and concentric alignment with respect to the axis of said arbor.

References Cited in the file of this patent

UNITED STATES PATENTS

| | | |
|---|---|---|
| 192,567 | Cochrane | July 3, 1877 |
| 321,378 | Mahaffey | June 30, 1885 |
| 799,124 | Westman | Sept. 12, 1905 |
| 987,391 | Michell | Mar. 21, 1911 |
| 1,166,408 | Blood | Dec. 28, 1915 |
| 2,960,129 | Osborn | Nov. 15, 1960 |
| 2,963,060 | Walther | Dec. 6, 1960 |

FOREIGN PATENTS

| | | |
|---|---|---|
| 460,532 | Canada | Oct. 25, 1949 |